United States Patent [19]

Pan et al.

[11] Patent Number: 5,196,284
[45] Date of Patent: Mar. 23, 1993

[54] ERASABLE PHASE CHANGE OPTICAL RECORDING ELEMENTS AND METHODS

[75] Inventors: Kee-chuan Pan, Pittsford; Yuan-sheng Tyan, Webster; Fridrich Vazan, Pittsford, all of N.Y.

[73] Assignee: Eastman Kodak Company, Rochester, N.Y.

[21] Appl. No.: 594,501

[22] Filed: Oct. 9, 1990

[51] Int. Cl.$^5$ .................................................. G11B 7/24
[52] U.S. Cl. .................................... 430/19; 430/495; 430/945; 430/346; 369/288
[58] Field of Search .................. 430/495, 19, 945, 346; 346/135.1; 369/288

[56] References Cited

U.S. PATENT DOCUMENTS

| | | | |
|---|---|---|---|
| 4,577,291 | 3/1986 | Cornet | 365/126 |
| 4,647,944 | 3/1987 | Gravesteijn et al. | 346/1.1 |
| 4,670,345 | 6/1987 | Morimoto et al. | 428/411.1 |
| 4,787,077 | 11/1988 | Barton et al. | 369/100 |
| 4,960,680 | 10/1990 | Pan et al. | 430/346 |
| 4,981,772 | 1/1991 | Pan et al. | 430/346 |
| 5,011,723 | 4/1991 | Harigaya et al. | 428/64 |
| 5,015,548 | 5/1991 | Pan et al. | 430/19 |
| 5,077,181 | 12/1991 | Pan et al. | 430/495 |

OTHER PUBLICATIONS

Yasuoka et al, "Novel 1-Beam-Overwriting Method for Phase-Change Erasable Disc", Technical Digest, International Symposium on Optical Memory, Tokyo, Japan (Sep. 1987).

Nishida et al, "Effect of Tl and Metallic Element Addition to In-Se Based Phase-Change Optical Recording Film", Id., at 91.

Yamada et al, "High Speed Over-Writable Phase Change Optical Disc Materials", Id., at 87.

*Primary Examiner*—Charles L. Bowers, Jr.
*Assistant Examiner*—John A. McPherson
*Attorney, Agent, or Firm*—Doreen M. Wells

[57] ABSTRACT

An optical recording element comprising a thin film optical recording layer of an alloy is disclosed. The alloy is represented by the formula:

$$Sb_xCd_{1-x}$$

wherein x is between about 0.68 and 0.83, and the formula:

$$Sb_xCd_ySn_z,$$

wherein $Sb_xCd_ySn_z$ is within the polygon enclosed by $Sb_{83}Cd_{17}$-$Sb_{46}Cd_{24}Sn_{30}$-$Sb_{42}Cd_{46}Sn_{12}$-$Sb_{68}Cd_{32}$ in a ternary Sb-Cd-Sn composition diagram.

9 Claims, 5 Drawing Sheets

ERASABLE PHASE CHANGE OPTICAL RECORDING ELEMENTS AND METHODS

FIELD OF THE INVENTION

This invention relates to antimony-cadmium alloys that are useful in optical recording.

BACKGROUND OF THE INVENTION

Optical recording, a technique utilizing a focused laser beam to make micron size marks in an appropriate medium for high density information recording, has been extensively studied in recent years. There are basically two types of optical recording; write-once and the erasable. In write-once recording, the media can only be recorded once, but the recorded information can be read many times. In erasable recording, the recorded information can be erased and new information can be recorded over the same area of the media.

There are several commercially available write-once optical recording products, but the introduction of erasable products has been plagued with delays. One of the major difficulties has been the availability of good media.

The technique most widely studied for erasable recording has been based on magneto-optic materials. This technique relies on the thermal-magnetic recording process. A focused laser beam is used to heat a spot on a magneto-optical material so that its coercivity is reduced and the magnetization within the spot can be switched by an applied field. The readout is accomplished by sensing the Kerr rotation of a reading laser beam induced by the magnetization in the media. Good recording performance has been reported by many working in the field. However, all reports are based on rare-earth/transition metal alloys, notably TbFeCo. However, there are some disadvantages about magnetic-optical systems. First of all, the magneto-optical drive is more complex than an optical drive. Secondly, it takes great effort to make magnetic-optical medium directly over-writable. Another problem with the alloys is that the properties critical to the optical recording process are extremely sensitive to the composition of the alloys. A few percent deviation from the optimum composition can degrade the performance significantly.

An alternative technique for erasable recording uses amorphous-crystalline phase-change materials. In this technique, a focused laser beam is used to switch the material between the amorphous state and the crystalline state. As is commonly done, a high power laser is used to heat a spot on the material to above its melting point to randomize the atomic arrangement in the material. When the laser beam is switched off, the material is left in the metastable amorphous state because of the high cooling rate. A low power laser is then used to heat the material to below the melting point. The increased mobility of the atoms at the elevated temperature then allows the material to go to the more stable crystalline state. Thus by varying the power and duration of the laser beam, the material can be switched between the amorphous state and the crystalline state, and erasable recording is thus accomplished.

The major problem in the development of this technique has been the lack of appropriate materials. In particular, it has been difficult to find materials which have crystallization rate high enough under laser heating to allow high rate recording (erasure time <1 µs), and yet slow enough at room temperature to ensure data integrity.

With slower erasing materials, the erase beam spot is normally made elliptical. This means that two lasers are needed in the recorder head. With faster erasing materials, only one laser, providing a circular spot, is needed in the recording head. The simplicity and cost advantage of a one-laser head over a two-laser head is apparent. Also, lower power laser pulse means lower laser cost and shorter laser pulse means higher data rate. In addition, low power laser pulse is less likely to damage the substrate. It is evident from the above discussions that super-sensitive media will offer many advantages.

U.S. Pat. No. 4,787,077 describes a method of erasable recording using single-phase phase-change alloys. Whereas the crystallization rate of the preferred material, $(GeTe)_{0.85}Sn_{0.15}$, appeared to be high (erasure time <55 ns), the laser power required for write and erase was also high (18 mW and 10 mW, respectively). While there was no mention of the corrosion resistance of the material, it contains a high concentration of corrosion prone tellurium.

Hiroshi Yasuoka et al. (Novel 1-Beam-Overwriting Method for Phase-Change Erasable Disc, Technical Digest, International Symposium on Optical Memory, Tokoyo, Japan (1987)), reported that In-Se-Tl can be cycled by 16 mW and 8 mW laser pulses of 60 ns. The problem with the composition of Yasuoka et al is that it requires higher laser power and longer laser pulse lengths than the present invention which, by comparison, requires laser powers less than 11 mW and a pulse length of 50 ns.

Tetsuya Nishida, et al. (Effect of Tl and Metallic Element Addition to In-Se based Phase-Change Optical Recording Film, Id., at 91) studied the same system, but they, too, failed to achieve the fast write-erase rates and high sensitivity of the present invention. Their write and erase pulses were 15 mW/60 ns and 12 mW/200 ns, respectively.

Noboru Yamada et al. (High Speed Over-writable Phase Change Optical Disc Materials, Id., at 87), investigated the pseudo-binary system of Sb2Te3-GeTe. A GeSb2Te4 thin film was cycled by 40 ns pulses at 25 mW and 12 mW. Although the pulse length was shorter in this pseudo-binary system, the laser power was higher than in the present invention.

Optical recording elements having $Sb_xCd_{1-x}$ or $Sb_xCd_ySn_z$ phase change alloy recording layers are made by depositing a layer of the alloy on an appropriate substrate. As deposited, the layers are amorphous. The amorphous as formed recording layer is first converted to a crystalline recording layer before use. This is commonly referred to as the initialization process.

A high power laser pulse can serve as the initialization pulse. However, the initialization can be accomplished in several ways such as by heating the material to above the melting point of the film using laser laser pulses of various duration, or by heating the films either in an oven or using high power short duration light pulses. The use of laser or light pulses is usually more desirable because these methods can heat up the media layer without affecting other components in the recording element.

As discussed above in describing the write-erase procedure, the use of super-sensitive media would offer many advantages. Thus, the problem that the present invention seeks to solve is to provide erasable optical recording media with improved sensitivity and fast write-erase rates.

The present invention also seeks to improve the corrosion resistance of the alloy.

SUMMARY OF THE INVENTION

Figure 1:
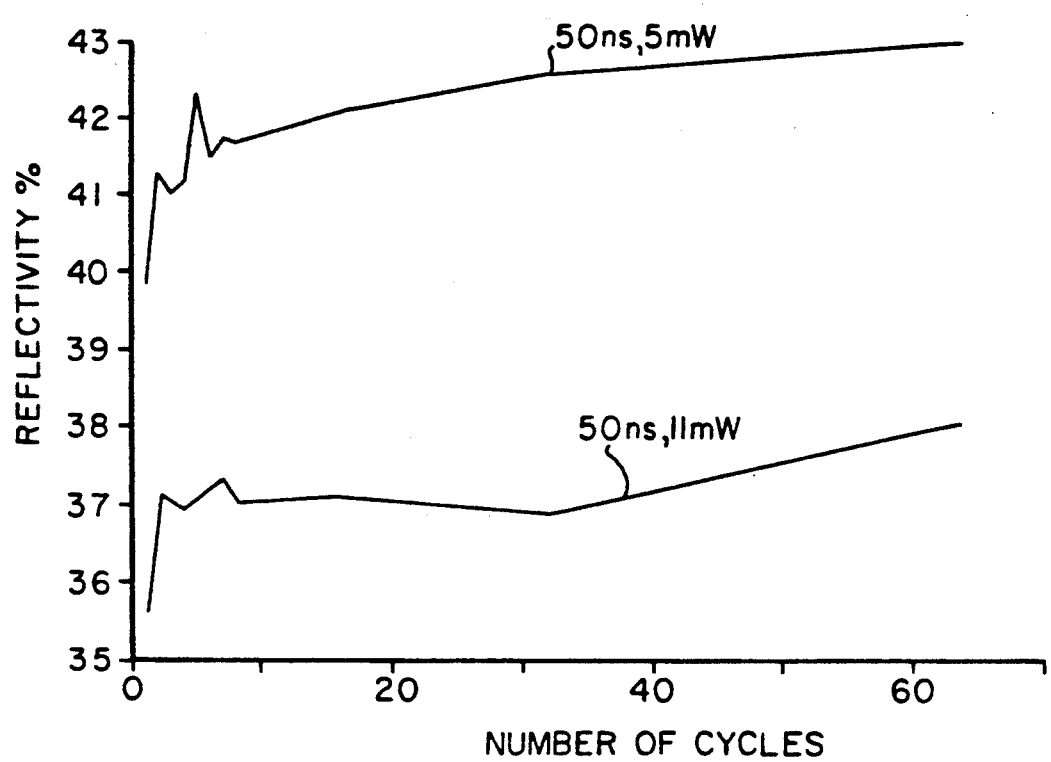
FIG. 1 shows the change of reflectivity during static write/erase cycles for $Sb_{79}Cd_{21}$ thin film which has a clear polymer (acrylic) overcoat, reflectivity of the virgin film being 37.2%.

In accordance with the present invention, there is provided an optical recording element comprising a thin film optical recording layer of an alloy, said alloy represented by the formula:

$$Sb_xCd_{1-x}$$

wherein x is between about C 68 and 0.83, and the formula:

$$Sb_x Cd_y Sn_z$$

wherein $Sb_xCd_ySn_z$ is within the polygon enclosed by $Sb_{83}Cd_{17}$-$Sb_{46}Cd_{24}Sn_{30}$-$Sb_{42}Cd_{46}Sn_{12}$-$Sb_{68}Cd_{32}$ in a ternary Sb-Cd-Sn composition diagram.

DETAILED DESCRIPTION OF THE INVENTION

The alloys useful in the invention have fast write-erase rates, improved sensitivity, and corrosion resistance. For example, at $Sb_{79}Cd_{21}$ composition, the medium can be cycled at 50 ns and at 11 and 5 mW. At 50 ns, a composition of $Sb_{56}Cd_{24}Sn_{20}$ can be cycled at 8 and 4 mW; at 60 ns, a composition of $Sb_{59}Cd_{30}Sn_{11}$ can be cycled at 10 and 3 mW; and at 200 ns, a composition of $Sb_{59}Cd_{30}Sn_{11}$ can be cycled at 8 and 3 mW. In addition, the film is thermally stable and corrosion resistant. It can be cycled many times without any decrease in reflectivity change between the low reflectivity state and the high reflectivity state.

In the binary compositions Cd should be between 17 and 32%. Preferably, Cd should be between about 20 and 28%.

In the ternary alloys, $Sb_xCd_ySn_z$ should be within the polygon enclosed by $Sb_{83}Cd_{17}$-$Sb_{46}Cd_{24}Sn_{30}$-$Sb_{42}Cd_{46}Sn_{12}$-$Sb_{68}Cd_{32}$ in a ternary Sb-Cd-Sn composition diagram. Outside this polygon, increasing Cd will slow down rate of erasure; increasing Sb and/or Sn will make amorphization (decreasing reflectivity) difficult; and increasing Sn will de-stabilize the amorphous film.

In the most preferred compositions, $Sb_xCd_ySn_z$ should be within the polygon enclosed by $Sb_{80}Cd_{20}$-$Sb_{52}Cd_{24}Sn_{24}$-$Sb_{46}Cd_{40}Sn_{14}$-$Sb_{72}Cd_{28}$.

Erasable recording is achieved by varying the power of the laser pulse. A high power pulse changes the material to an amorphous state and a low power laser changes the material to a crystalline state. It has been a common perception that rapid crystallization can only be realized when the composition is stoichiometric. It is important to note that the present invention are not stoichiometric, but they show a rapid change of optical reflectivity after the initialization process.

The media can be prepared by conventional vacuum deposition processes, such as evaporation and sputtering, onto a variety of substrates. The layer thickness is preferably between 3 and 300 nm. An overcoat layer is preferably applied over the alloy layer to reduce any alloy deformation as a result of the recording processes. Such deformation can result in residual signals that can not be erased by the erasing process. Common overcoat materials are polymer coatings such as those described in U.S. Pat. No. 4,340,655 issued Jul. 10, 1982 to Hollister et al and dielectric coatings such as $SiO_x$, ZnS, $Al_2O_3$, SiN, AlN, and SiC, etc. A commercially available acrylic spray paint such as clear Krylon ® can also be used.

After the alloy is deposited, the recording layer is initialized. The layer that is deposited by vacuum deposition is amorphous. The layer can be crystallized (initialized) by heating, for example in an over or by other conventional means such as with a laser or a high power flash lamp.

Optical recording layers can be prepared by conventional thin film deposition techniques such as RF (radio frequency) and DC (direct current) sputtering from an alloy target using the alloys of the invention. Enhancement of sputtering processes by applying magnetic fields (magnetron sputtering) can also be used.

Supports which can be used include plastic plates, such as polyethylene terephthalate, polymethyl methacrylate, and polycarbonate, a glass plate, polymer coated glass, paper and metallic plates such as aluminum, etc.

Erasable recording can be achieved by varying the power of the laser pulses. A high power (e.g., 60 ns, 10 mW) pulse changes the material to a low reflectivity amorphous state and a low power (e.g., 60 ns, 3 mW) pulse changes the material to a high reflectivity crystalline state.

Thus, according to another aspect of the invention, there is provided a method of recording and erasing information on an optical recording element, said element comprising a thin film optical recording layer of an alloy in a crystalline form, said alloy represented by the formula:

$$Sb_xCd_{1-x}$$

wherein x is between about 0.68 and 0.83, and the formula:

$$Sb_xCd_ySn_z$$

wherein $Sb_xCd_ySn_z$ is within the polygon enclosed by $Sb_{83}Cd_{17}$-$Sb_{46}Cd_{24}Sn_{30}$-$Sb_{42}Cd_{46}Sn_{12}$-$Sb_{68}Cd_{32}$ in a ternary Sb-Cd-Sn composition diagram, comprising the steps of:
 a) recording said information by focusing an information modulated laser beam on said crystallized alloy recording layer at a power and for a time sufficient to form a pattern of amorphous areas in said layer of alloy, said pattern corresponding to said information, and b) focusing a laser beam on said recorded layer for a time and at a power sufficient to crystallize at least a portion of the amorphous areas formed in step a), thereby erasing the information in the amorphous areas.

In a preferred method, information is recorded and previously recorded information is erased in one step. The energy source in this embodiment is varied between a level which will crystallize and a level which will amorphize. The phase state of each portion of the layer is determined in one pass and any previously recorded information is over-written. Thus, there is provided a method of recording information on an optical recording element, the element comprising a thin film optical recording layer of an alloy, the alloy represented by the formula:

$Sb_xCd_{1-x}$ wherein x is between about 0.68 and 0.83, and the formula:

$Sb_xCd_ySn_z$, wherein $Sb_xCd_ySn_z$ is within the polygon enclosed by $Sb_{83}Cd_{17}$-$Sb_{46}Cd_{24}Sn_{30}$-$Sb_{42}Cd_{46}Sn_{12}$-$Sb_{68}Cd_{32}$ in a ternary Sb-Cd-Sn composition diagram, wherein the information is recorded by a series of energy pulses, the power of the pulses being varied between at least two levels comprising a lower level sufficient to form crystalline areas and a second higher level sufficient to form amorphous areas.

A useful recording material comprises, starting from the outside surface of the recording material, an overcoat layer, a thin film optical recording layer as described and a substrate. In response to a drive signal, the intensity of a diode recording beam focused on the recording layer is modulated in accordance with information to be recorded.

During recording, the recording material is spun at a constant rate, e.g., 1800 rotations per minute (rpm). As a result, a track of information is recorded on the optical recording layer in the form of selected amorphized areas. As recording continues, the recording spot is caused to scan radially inward across the recording material, thereby causing information to be recorded along a spiral or concentric track. The sizes and spacings of the recorded information marks vary in accordance with the information content of the recording laser drive signal, as well as with radial position on the recording material.

During the readback process, the thus recorded information bearing recording material is spun at the same rate as it was spun during the recording process. The optical path of a readout laser beam is focused to a playback spot on the recording material by a high numerical aperture lens. The recording material is of the reflective type so that the radiation forming the playback spot is reflected back through the high numerical aperture lens after interacting with the information marks recorded on the optical recording material. A lens directs reflected laser radiation onto a detector which produces an electrical playback signal in response to temporal variations (contrast) in the irradiance of the reflected laser radiation falling on the detector.

Other types of recording materials are also useful. For example, a reflective substrate such as aluminum can be provided with a recording layer comprising an alloy of the invention on both sides of the substrate. A useful recording material is thus, aluminum coated on both sides with a smoothing layer, a layer of the phase change alloy of the invention and a layer of a clear protective overcoat. In a similar embodiment, the alloy is provided on a clear substrate which is then adhered to both sides of the substrate with an adhesive. In yet another embodiment, the alloy as described is provided on a transparent substrate to form the recording layer. The optical recording layer is then adhered to the recording layer of an identical recording material with an adhesive layer. The thickness of the adhesive layer provides for the optical separation of the two recording layers.

The following examples are presented for a further understanding of the invention.

EXAMPLE 1

Thin films of this invention were prepared by a sputtering process. A target composed of mixed Sb and Cd powders was pre-sputtered in an 8 mtorr Ar atmosphere for one hour. The pre-sputtering step was designed to achieve a steady state deposition condition.

Thin films of about 80 nm in thickness were then prepared by sputtering the pre-sputtered mix for 3 minutes. The deposited film was on a glass substrate. The atomic fraction of each component in the prepared films was determined by inductively coupled plasma atomic emission spectrometry (ICP).

FIG. 1 shows the change of reflectivity during cycling for $Sb_{79}Cd_{21}$ thin film. A laser pulse was used for initialization.

Other binary erasable compositions were also investigated. It was found that Cd could be varied from 17% to 32%. The sensitivity of the film increases, when the fraction of Cd decreases. When the Cd fraction drops below 17%, it becomes difficult to change the material into the amorphous state when the high power pulse is turned off.

EXAMPLE 2

A number of Sb-Cd-Sn thin films with a range of compositions were prepared according to the method in Example 1.

Figure 2:
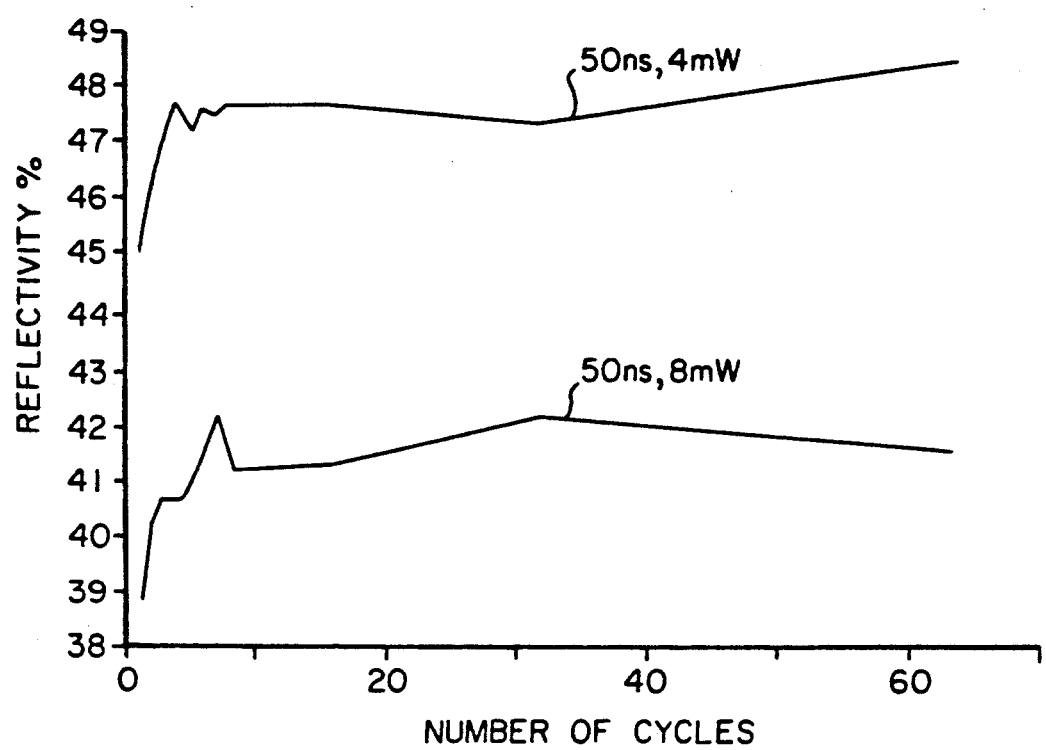
FIG. 2 shows the static write/erase cycles for $Sb_{56}Cd_{24}Sn_{20}$ thin film with a polymer overcoat, reflectivity of the as-deposited film being 37.2%.
Figure 3:
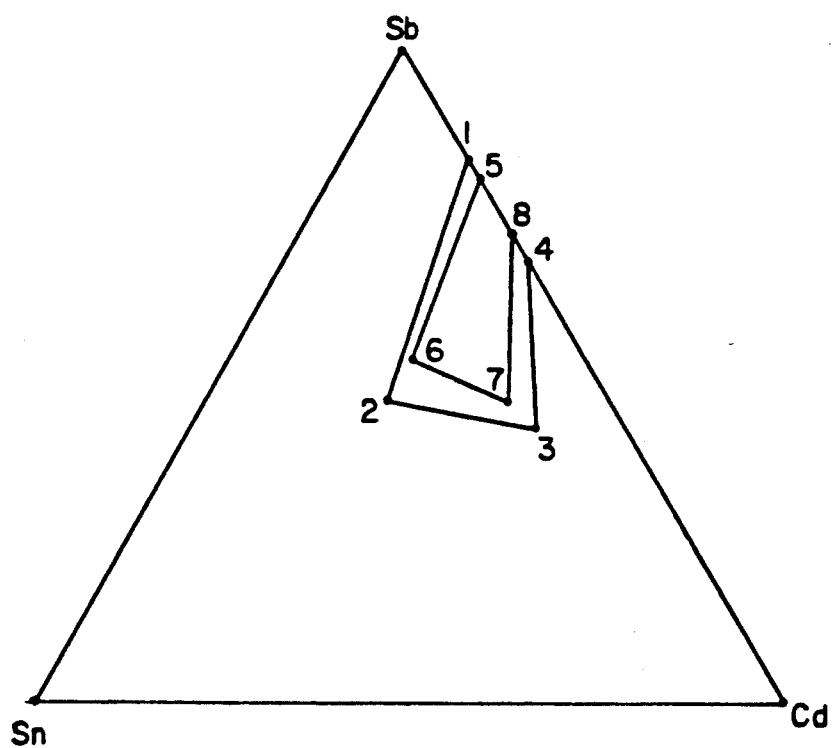
FIG. 3 shows the erasable region for Sb-Cd-Sn. The film with a composition within the polygon 1-2-3-4 ($Sb_{83}Cd_{17}$-$Sb_{46}Cd_{24}Sn_{30}$-$Sb_{42}Cd_{46}Sn_{12}$-$Sb_{68}Cd_{32}$) can be cycled at power less than 12 mW and pulse length shorter than 1 us. The compositions within the polygon 5-6-7-8 ($Sb_{80}Cd_{20}$-$Sb_{52}Cd_{24}Sn_{24}$-$Sb_{46}Cd_{40}Sn_{14}$-$Sb_{72}Cd_{28}$) are preferred.

FIG. 2 shows a cycling behavior of $Sb_{56}Cd_{24}Sn_{20}$ thin film.

In the defined region in FIG. 2, the initialization process becomes easier with increasing concentration of Sn in the film. The sensitivity of the media improves when the fraction of Sn or Sb increases. However, further adding Sn or Sb to beyond the defined region will make the material too sensitive to be erasable. It is then a good write-once material.

EXAMPLE 3

Several homogeneous Sb-Cd-Sn alloy sputtering targets with various compositions were prepared by powder-pressing. The thin films were prepared by the sputtering process.

Figure 4:
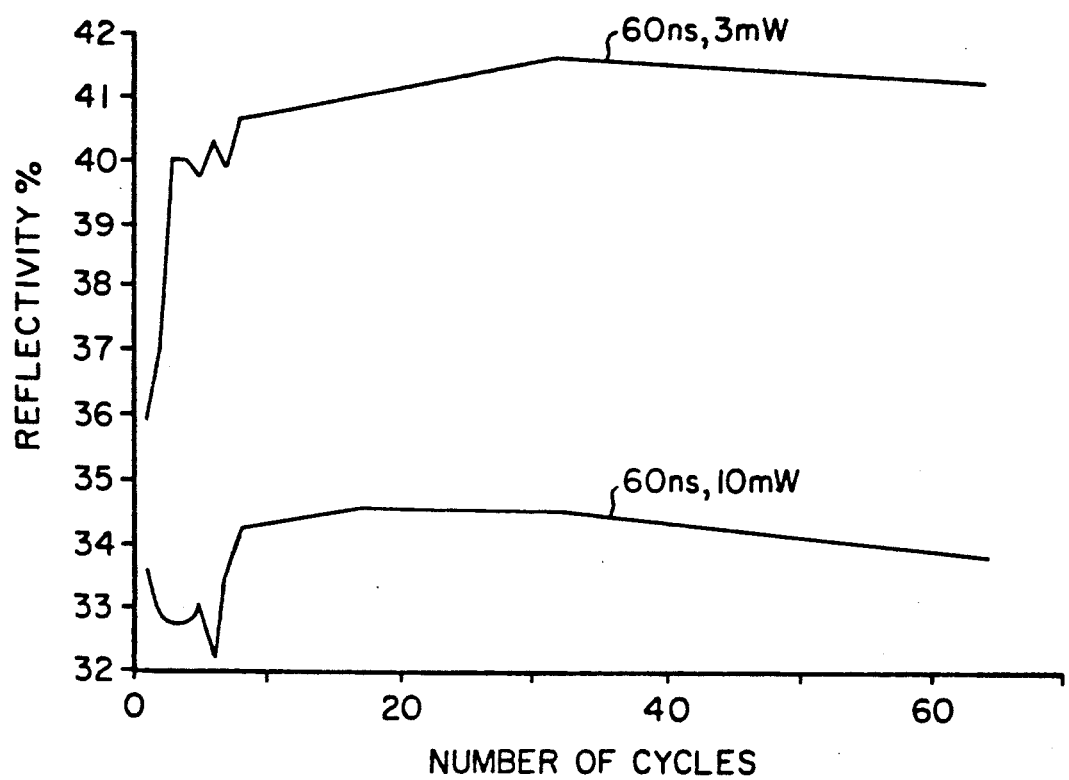
FIG. 4 shows the static write and erase cycles for $Sb_{59}Cd_{30}Sn_{11}$ at 60 ns, 10 mW/60 ns, 3 mW. Reflectivity of the as-deposited film is 31.5%.
Figure 5:
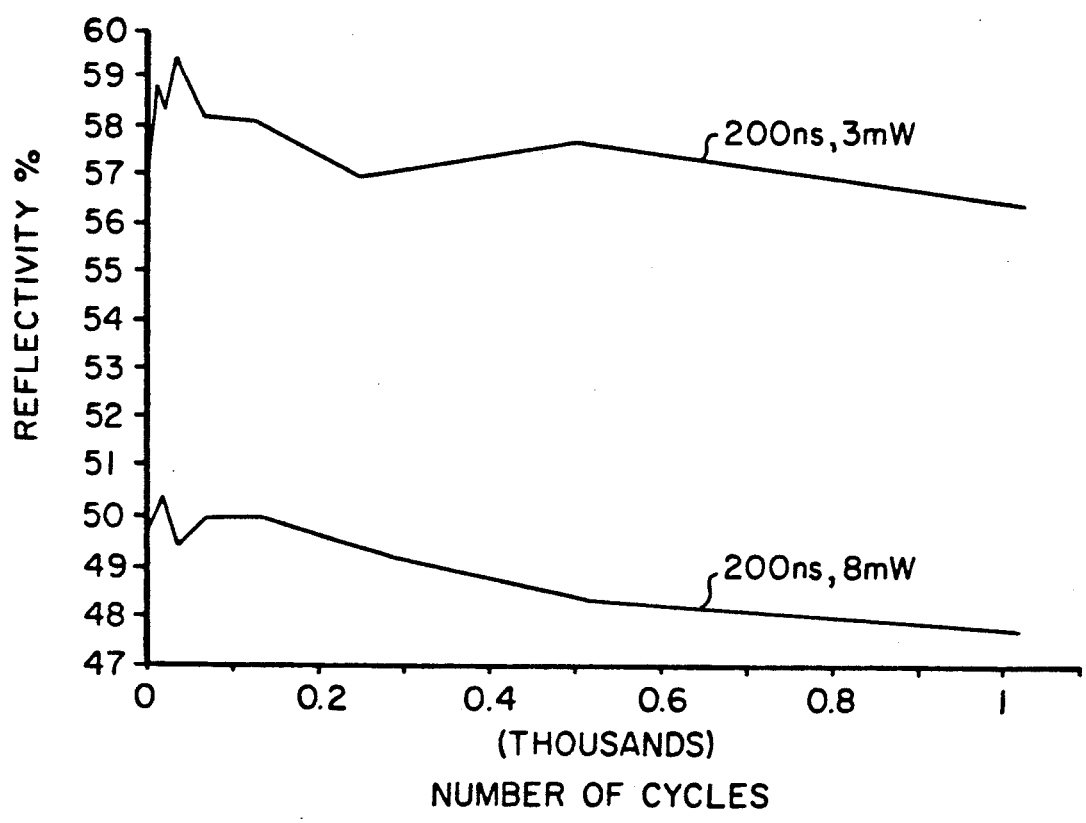
FIG. 5 shows the static write and erase cycles for $Sb_{59}Cd_{30}Sn_{11}$ at 200 ns, 8 mW and 200 ns, 3 mW, respectively.

FIGS. 4 and 5 show the cycling behavior of $Sb_{59}Cd_{30}Sn_{11}$ erasable thin film at different write/erase conditions. The film was also cycled to $10^5$ times without seeing a decrease in reflectivity change between the low reflectivity state and the high reflectivity state.

The above film with many low reflectivity marks and high reflectivity marks, but without a protective overcoat, was placed in a chamber at 70° C. and 70% relative humidity for an accelerated stability test. After 15 days, the film was examined. No change was observed on the as-deposited film, nor on the marks made by the high or low power pulses. This result indicates that the film is thermally stable and corrosion resistant.

The invention has been described in detail with particular reference to preferred embodiments thereof, but it will be understood that variations and modifications can be effected within the spirit and scope of the invention.

We claim:

1. An erasable, initialized optical recording element consisting essentially of a thin film optical recording layer of an alloy in a crystalline form, said alloy represented by the formula:

$$Sb_xCd_{1-x}$$

wherein x is between about 0.68 and 0.83.

2. An optical recording element according to claim 1, wherein x is between 0.72 and 0.80.

3. An erasable, initialized optical recording element comprising a thin film optical recording layer of an alloy in a crystalline form, said alloy represented by the formula:

$$Sb_xCd_ySn_z$$

wherein $Sb_xCd_ySn_z$ is within the polygon enclosed by $Sb_{83}Cd_{17}$-$Sb_{46}Cd_{24}Sn_{30}$-$Sb_{42}Cd_{46}Sn_{12}$-$Sb_{68}Cd_{32}$ in a ternary Sb-Cd-Sn composition diagram.

4. An optical recording element according to claim 3, wherein $Sb_xCd_ySn_z$ is within the polygon enclosed by $Sb_{80}Cd_{20}$-$Sb_{52}Cd_{24}Sn_{24}$-$Sb_{46}Cd_{40}Sn_{14}$-$Sb_{72}Cd_{28}$.

5. An optical recording element according to claim 1 or 3 further comprising an overcoat layer.

6. A method of recording and erasing information on an optical recording element, said element comprising a thin film optical recording layer of an alloy in a crystalline form, said alloy represented by the formulae:

$$Sb_xCd_{1-x}, \text{ or}$$

$$Sb_xCd_ySn_z,$$

said method comprising the steps of:
a) recording said information by focusing an information modulated laser beam on said crystallized alloy recording layer at a power and for a time sufficient to form a pattern of amorphous areas in said layer of alloy, said pattern corresponding to said information, and
b) focusing a laser beam on said recorded layer for a time and at a power sufficient to crystallize at least a portion of the amorphous areas formed in step a), thereby erasing the information in said amorphous areas.

7. A method of recording information on an optical recording element, said element comprising a thin film optical recording layer of an alloy, said alloy represented by the formulae:

$$Sb_xCd_{1-x}, \text{ or}$$

$$Sb_xCd_ySn_z,$$

wherein said information is recorded by a series of energy pulses, the power of said pulses being varied energy pulses, the power of said pulses being varied between at least two levels, said levels comprising a lower level sufficient to form crystalline areas and a second higher level sufficient to form amorphous areas.

8. The methods of claim 6 or 7, wherein writing and erasure are carried out for a plurality of cycles.

9. An optical recording element according to claim 1, wherein x is between about 0.68 and 0.79.

* * * * *